United States Patent
Hashimoto et al.

(10) Patent No.: US 9,068,054 B2
(45) Date of Patent: Jun. 30, 2015

(54) SIZING AGENT FOR REINFORCEMENT FIBERS, SYNTHETIC FIBER STRAND, AND FIBER-REINFORCED COMPOSITE

(75) Inventors: Yoshio Hashimoto, Yao (JP); Yusuke Shimizu, Yao (JP); Mikio Nakagawa, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 82 days.

(21) Appl. No.: 13/810,614

(22) PCT Filed: Jul. 27, 2011

(86) PCT No.: PCT/JP2011/067029
§ 371 (c)(1),
(2), (4) Date: Jan. 16, 2013

(87) PCT Pub. No.: WO2012/017877
PCT Pub. Date: Feb. 9, 2012

(65) Prior Publication Data
US 2013/0123407 A1    May 16, 2013

(30) Foreign Application Priority Data
Aug. 5, 2010 (JP) .................... 2010-175831

(51) Int. Cl.
| | | |
|---|---|---|
| C08K 5/17 | (2006.01) | |
| C08K 9/04 | (2006.01) | |
| C08J 5/06 | (2006.01) | |
| D06M 13/332 | (2006.01) | |
| D06M 13/368 | (2006.01) | |
| D06M 15/227 | (2006.01) | |
| D06M 15/53 | (2006.01) | |
| D06M 15/572 | (2006.01) | |

(52) U.S. Cl.
CPC ... C08K 5/17 (2013.01); C08K 9/04 (2013.01); C08J 5/06 (2013.01); D06M 13/332 (2013.01); D06M 13/368 (2013.01); D06M 15/227 (2013.01); D06M 15/53 (2013.01); D06M 15/572 (2013.01); D06M 2200/50 (2013.01)

(58) Field of Classification Search
CPC .......... C08K 5/17; C08K 9/04; D06M 15/227
USPC ................. 524/247, 513, 576, 582; 428/378; 523/205
See application file for complete search history.

(56) References Cited

U.S. PATENT DOCUMENTS

| | | |
|---|---|---|
| 7,589,145 B2 * | 9/2009 | Brant et al. ................... 524/515 |
| 2005/0014906 A1 | 1/2005 | Niino |
| 2006/0258810 A1 | 11/2006 | Sugiura et al. |
| 2009/0270547 A1 | 10/2009 | Sugiura et al. |
| 2009/0317550 A1 | 12/2009 | Sugiura et al. |
| 2011/0136951 A1 | 6/2011 | Kitano et al. |
| 2012/0015186 A1 | 1/2012 | Honma et al. |

FOREIGN PATENT DOCUMENTS

| | | |
|---|---|---|
| JP | 02-084566 A | 3/1990 |
| JP | 06-107442 A | 4/1994 |
| JP | 2003-253563 A | 9/2003 |
| JP | 2005-048343 A | 2/2005 |
| JP | 2005-226193 A | 8/2005 |
| JP | 2006-233346 A | 9/2006 |
| JP | 2006-291377 A | 10/2006 |
| JP | 2010-149353 A | 7/2010 |
| WO | 2009-093748 A1 | 7/2009 |

* cited by examiner

*Primary Examiner* — Vickey Nerangis
(74) *Attorney, Agent, or Firm* — Global IP Counselors, LLP

(57) ABSTRACT

A sizing agent for reinforcement fibers which imparts good bonding performance to a reinforcement fiber is used to reinforce thermoplastic matrix resin, and provide a synthetic fiber strand applied with the sizing agent and a fiber-reinforced composite reinforced with the synthetic fiber strand. The sizing agent essentially contains a neutralization product of a modified polypropylene resin and an amine compound having at least two hydroxyl groups or amino groups in the molecule, and the nonvolatile component of the sizing agent exhibits an endothermic heat of fusion not higher than 50 J/g in determination with a differential scanning calorimeter (DSC).

17 Claims, No Drawings

SIZING AGENT FOR REINFORCEMENT FIBERS, SYNTHETIC FIBER STRAND, AND FIBER-REINFORCED COMPOSITE

CROSS-REFERENCE TO RELATED APPLICATIONS

This U.S. National stage application claims priority under 35 U.S.C. §119(a) to Japanese Patent Application No. 2010-175831, filed in Japan on Aug. 5, 2010, the entire contents of which are hereby incorporated herein by reference.

TECHNICAL FIELD

The present invention relates to a sizing agent for reinforcement fibers to be employed in reinforcement of thermoplastic matrix resin, and a synthetic fiber strand and fiber-reinforced composite manufactured therewith. More precisely, the present invention relates to a sizing agent for reinforcement fibers which imparts good bonding performance to a synthetic fiber strand with a thermoplastic matrix resin, and a synthetic fiber strand and fiber-reinforced composite manufactured therewith.

TECHNICAL BACKGROUND

Fiber-reinforced composites manufactured by reinforcing plastic materials (called matrix resins) with various synthetic fibers are used widely in automotive application, aviation and space application, sporting and leisure goods application, and general industrial use. Fibers employed for the composites include inorganic fibers, such as carbon fiber, glass fiber and ceramic fiber; and organic fibers, such as aramid fiber, polyamide fiber and polyethylene fiber. These synthetic fibers are usually produced into filament, and later processed into various forms of reinforcement textiles, including a sheeted intermediate material called unidirectional prepreg which is manufactured by applying hot melt resin to fabric and winding it onto a drum, textile material manufactured by filament winding, woven fabric or chopped fiber.

Prospective fiber-reinforced composites are those manufactured of thermoplastic resins including polyolefin resins, nylon resins, polycarbonate resins, polyacetal resins, ABS resins, polyphenylene sulfide resins and polyetherimide resins among the matrix resins mentioned above, which attract the attention because of their good moldability and advantage in recycling. Of these resins, polyolefin resins have better moldability and chemical resistance and are more advantageous in manufacturing cost than other resins. Thus fiber-reinforced composites manufactured of the polyolefin matrix resins attract much attention and are expected to be applicable to various uses as a versatile material.

Reinforcement fibers are often used in a form of chopped fiber cut into 1 to 15 mm long. The chopped fiber should have sufficient cohesion when it is knead with a thermoplastic resin to be manufactured into pellets, and chopped fiber having insufficient cohesion cannot be fed constantly to pellet manufacturing. In addition, reinforcement fiber strands having insufficient fiber cohesion sometimes break to deteriorate the property of resultant fiber-reinforced composite. For preventing such troubles, number of techniques for imparting optimum cohesion to reinforcement fiber by applying sizing agents containing modified polyolefin resins as a base component have been proposed (see JP A 2006-233346 and JPA 6-107442) and widely employed in industrial fields.

On the other hand, reinforcement fibers are increasingly processed into a form called long-fiber pellet or into unidirectional sheet, tape or fabric to be impregnated with thermoplastic resins and molded in subsequent processes like as composite materials of thermosetting resins, in order to effectively achieve the properties of reinforcement fibers including tensile strength. In such cases, hot-melt thermoplastic resins should quickly penetrate into fiber strands, specifically, fill space between single fibers in molding fiber-reinforced composites in order to shorten the molding time and improve the physical properties of resultant composites.

However, sizing agents disclosed in the prior art have further exhibited deteriorated poor wetting and bonding characteristics between sized fiber and matrix resin in molding process to further deteriorate mechanical properties of resultant composites in some cases where polyolefin resins inherently having poor wetting propensity are employed as a matrix resin.

Under such situation, a sizing agent which improves the affinity between sized fiber and matrix resin to firmly bond the fiber and resin has been demanded in the field of fiber-reinforced composites containing thermoplastic matrix resins, especially polyolefin matrix resins.

DISCLOSURE OF INVENTION

Technical Problem

With the view of the conventional technical background, the present invention aims to provide a sizing agent which imparts excellent bonding performance to reinforcement fibers used to reinforce thermoplastic matrix resins, especially polyolefin matrix resins, and synthetic fiber strands and fiber-reinforced composites manufactured therewith.

Technical Solution

The inventors of the present invention diligently studied to solve the problem mentioned above, and found that the endothermic heat of fusion of the nonvolatile component and neutralizer of a sizing agent, which contains a modified polypropylene resin, one of modified polyolefin resins, is the most influential on the bonding between sized synthetic fiber strands and thermoplastic matrix resins.

More precisely, the inventors found that 1) a sizing agent which contains a neutralization product of a modified polypropylene resin and a specific amine compound having at least two hydroxyl groups or amino groups in the molecule, and contains nonvolatile component exhibiting an endothermic heat of fusion not greater than a specific value achieves greatly improved bonding between sized fiber strands and thermoplastic matrix resins, and thus achieved the present invention.

The inventors further found that 2) modified polyolefin resins other than the modified polypropylene resin did not show improved bonding between sized fiber strands and matrix resins with any neutralizers, 3) modified polypropylene resins did not show improved bonding between sized fiber strands and matrix resins if an alkali metal salt or amine compound other than the specific amine compounds mentioned above is employed as the neutralizer, and 4) even a sizing agent containing a neutralization product of a modified polypropylene resin and the specific amine compound mentioned above did not show improved bonding between sized fiber strands and matrix resins if the nonvolatile component of the sizing agent exhibits endothermic heat of fusion greater than a specified value; and achieve the present invention.

Specifically, the sizing agent for reinforcement fibers of the present invention is applied to fibers used to reinforce thermoplastic matrix resins, and essentially contains a neutralization product of a modified polypropylene resin and an amine compound having at least two hydroxyl groups or at least two amino groups in the molecule. The nonvolatile component of the sizing agent exhibits an endothermic heat of fusion not higher than 50 J/g in determination with a differential scanning calorimeter (DSC).

The sizing agent for reinforcement fibers of the present invention has been formulated by blending the modified polypropylene resin in an amount ranging from 10 to 90 weight percent to the whole amount of the nonvolatile component of the sizing agent and the amine compound in an amount ranging from 1 to 20 weight percent to the whole amount of the nonvolatile component of the sizing agent.

The amine compound preferably has a boiling point within the range from 240 to 340 deg. C. and should preferably be a compound represented by the following chemical formula (1) and/or (2):

$$R^1N(CH_2CH_2OH)_2 \quad (1)$$

where $R^1$ is a hydrogen atom, —$CH_2CH_2OH$, $C_1$-$C_{10}$ aliphatic hydrocarbon group or a residue of a $C_1$-$C_{18}$ fatty acid having lost a hydroxyl group;

$$NH_2R^2NH(CH_2CH_2OH) \quad (2)$$

where $R^2$ is a $C_1$-$C_4$ aliphatic hydrocarbon group.

The modified polypropylene resin contained in the sizing agent for reinforcement fibers of the present invention should preferably exhibit an endothermic heat of fusion not higher than 70 J/g in determination with a differential scanning calorimeter (DSC). In addition, the modified polypropylene resin should preferably have an acid value ranging from 20 to 80 KOHmg/g.

Furthermore, the sizing agent for reinforcement fibers of the present invention should preferably contain at least one polymer component (A) selected from the group consisting of aromatic polyester resins and aromatic polyester polyurethane resins, in an amount ranging from 5 to 80 weight percent to the whole amount of the nonvolatile component of the sizing agent.

The thermoplastic matrix resin mentioned above should preferably be a polyolefin resin.

Further, the sizing agent for reinforcement fibers of the present invention should preferably contain water in which the neutralization product mentioned above is dispersed or dissolved.

The synthetic fiber strand of the present invention is manufactured by applying the sizing agent for reinforcement fibers to a base synthetic fiber strand.

The base synthetic fiber strand should preferably be manufactured of at least one fiber selected from the group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber.

The fiber-reinforced composite of the present invention contains a thermoplastic matrix resin and the synthetic fiber strand mentioned above.

Advantageous Effects

The sizing agent for reinforcement fibers of the present invention can attain an excellent bonding between a reinforcement fiber and a thermoplastic matrix resin, especially a polyolefin resin.

The synthetic fiber strand manufactured by applying the sizing agent for reinforcement fibers of the present invention to a base synthetic fiber strand has an excellent performance to bond with a thermoplastic matrix resin. The synthetic fiber strand of the present invention can be processed into fiber-reinforced composites having excellent properties.

BEST MODE FOR CARRYING OUT THE INVENTION

The present invention provides a sizing agent for reinforcement fibers used to reinforce thermoplastic matrix resins. The sizing agent essentially contains a neutralization product of a modified polypropylene resin and a specific amine compound, and the nonvolatile component of the sizing agent exhibits endothermic heat of fusion not higher than 50 J/g in determination with a differential scanning calorimeter (DSC). The present invention is described below in detail.

[Modified Polypropylene Resin]

The modified polypropylene resin employed in the present invention is a copolymer substantially containing propylene and an unsaturated carboxylic acid, and can be produced in a known method. The modified polypropylene resin can be a random copolymer of propylene and an unsaturated carboxylic acid, or a graft copolymer of polypropylene and an unsaturated carboxylic acid. The modified polypropylene resin employed in the present invention can contain one or plurality of such copolymers. The modified polypropylene resin employed in the present invention has an acidic group such as carboxyl group which has been introduced in copolymerization and has not been neutralized with basic compounds.

The unsaturated carboxylic acids include, for example, acrylic acid, methacrylic acid, crotonic acid, isocrotonic acid, maleic acid, maleic acid anhydride, fumaric acid, itaconic acid, citraconic acid, mesaconic acid, itaconic acid anhydride, citraconic acid anhydride and methyl methacrylate. One of or a combination of at least two of these carboxylic acids can be employed.

The mole percentages of propylene and an unsaturated carboxylic acid in the total monomers to be copolymerized into the modified polypropylene resin should respectively range from 80 to 99.9 mole percent for propylene and from 0.1 to 20 mole percent for the carboxylic acid, preferably from 90 to 99.7 mole percent and from 0.3 to 10 mole percent, and more preferably from 95 to 99.4 mole percent and from 0.6 to 5 mole percent. A modified polypropylene resin containing less than 80 mole percent of propylene can be formulated into a sizing agent having poor compatibility with matrix resin. On the other hand, a modified polypropylene resin containing more than 99.9 mole percent propylene can be formulated into a sizing agent which hinders bonding between sized fiber strand and matrix resin or has poor dispersibility in water to hinder uniform size application to fiber strand.

The sum of the propylene and unsaturated carboxylic acid in 100 mole percent of the total monomers to be copolymerized should be at least 90 mole percent, preferably at least 95 mole percent, more preferably at least 98 mole percent, and further more preferably 100 mole percent. If the sum of the propylene and unsaturated carboxylic acid is less than 90 mole percent, the resultant sizing agent hinders bonding between a reinforcement fiber and a matrix resin.

The modified polypropylene resin employed in the present invention contains no olefin monomers except propylene, or contains less than 10 mole percent of olefin monomers other than propylene in the total of monomers to be copolymerized. The mole percentage of the olefin monomers other than propylene should preferably be less than 5 mole percent, more preferably less than 2 mole percent, and further more preferably 0 mole percent. If the mole percentage of the olefin monomers other than propylene is 10 mole percent or higher, the resultant sizing agent hinders bonding between sized fiber and matrix resin. The olefin monomers other than propylene include ethylene, 1-butene, 2-methyl-1-butene, 3-methyl-1-butene, isobutene, 1-pentene, 4-methyl-1-pentene, 1-hexene, 1-decene and 1-dodecene.

The modified polypropylene resin employed in the present invention exhibits endothermic heat of fusion due to crystalline melting indicated by the endothermic peak of the resin determined with a differential scanning calorimeter (DSC). In the present invention, the endothermic heat of fusion due to crystalline melting indicated by an endothermic peak is defined to be the value (in the unit of J/g) calculated from the value of integral of the area surrounded by an endothermic peak appearing on a DSC curve and a line between the points at which the peak starts from and returns to the base line, where the endothermic peak curve is determined in the method with a DSC according to JIS K7121 and JIS K7122 mentioned later.

The endothermic heat of fusion of the modified polypropylene resin employed in the present invention determined with a DSC should preferably be not higher than 70 J/g, more preferably range from 1 to 68 J/g, further more preferably from 5 to 65 J/g, and most preferably from 10 to 60 J/g. A modified polypropylene resin exhibiting an endothermic heat of fusion greater than 70 J/g has excessive crystalline region in the polymer structure and can be formulated into a sizing agent which does not contribute to the bonding between sized fiber and matrix resin.

The acid value of the modified polypropylene resin employed in the present invention should preferably range from 20 to 80 KOHmg/g, more preferably from 30 to 70 KOHmg/g, and further more preferably from 40 to 60 KOHmg/g. A modified polypropylene resin having an acid value less than 20 KOHmg/g can have poor dispersibility in water. On the other hand, a modified polypropylene resin having an acid value greater than 80 KOHmg/g contains insufficient amount of polypropylene to form the major polymer structure and the resultant sizing agent has poor compatibility with a matrix resin.

The weight-average molecular weight of the modified polypropylene resin should preferably range from 3,000 to 150,000, more preferably from 8,000 to 100,000, and further more preferably from 20,000 to 60,000. A modified polypropylene resin having a weight-average molecular weight less than 3,000 can have poor heat resistance while a modified polypropylene resin having a weight-average molecular weight greater than 150,000 has poor dispersibility in water.

[Amine Compound]

The amine compound employed in the present invention has at least two hydroxyl groups or amino groups in the molecule, and is used to neutralize the modifier groups such as carboxyl groups introduced in the copolymerization of the modified polypropylene resin employed in the present invention. The sizing agent which essentially contains the neutralization product produced by neutralizing the modified polypropylene resin with the amine compound employed in the present invention can attain excellent bonding between sized fiber strand and matrix resin, because the neutralization effectively decreases the endothermic heat of fusion of the modified polypropylene resin due to crystalline melting. In addition, the neutralization product contributes to high drying efficiency of the sizing agent to shorten the drying time of the sizing agent so as to increase the processing speed. Further the shortened drying time prevents the thermal degradation of the sizing agent on fiber and contributes to excellent bonding between sized fiber and matrix resin.

On the other hand, a modified polypropylene resin neutralized with an amine compound other than the amine compound employed in the present invention fails to attain high bonding strength between sized fiber and matrix resin, because the amine compound neutralizing the modified polypropylene resin evaporates with heat in kneading sized reinforcement fiber and matrix resin and the synergy of the modified polypropylene resin and the amine compound is lost. In addition, a modified polypropylene resin neutralized with an alkaline metal, such as sodium hydroxide or potassium hydroxide, leads to poor drying efficiency of the resultant sizing agent and the sizing agent degrades with heat in manufacturing processes to cause poor bonding between a sized reinforcement fiber and a matrix resin.

Amine compounds having at least two hydroxyl groups in the molecule include diethanolamine, triethanolamine, triisopropanolamine, t-butyldiethanolamine, n-butyldiethanolamine, N-methyldiethanolamine, N-ethyldiethanolamine, and fatty acid alkanolamide.

Amine compounds having at least two amino groups in the molecule include N-aminoethylethanolamine, N-aminoethylisopropanolamine, dimethylaminopropylamine, diethylethylenediamine, ethylenediamine, diethylenetriamine, triethylenetetramine, tetraethylenepentamine, and pentaethylenehexamine.

The amine compound employed in the present invention should have a boiling point preferably ranging from 240 to 340 deg. C., more preferably from 250 to 330 deg. C., and further more preferably from 260 to 320 deg. C. An amine compound having such boiling point does not evaporate with heat in kneading a matrix resin and a reinforcement fiber and the amine compound successfully contributes to decreased endothermic heat of fusion of the modified polypropylene resin due to melting of the crystalline region. In other words, the amine compound contributes to decreased crystalline region of the modified polypropylene resin in a sizing agent to improve bonding between sized fiber and matrix resin.

Of those amine compound, amine compounds represented by the chemical formula (1) and/or the chemical formula (2) are preferable for their contribution to improved bonding between sized fiber and matrix resin, and those represented by the chemical formula (1) are more preferable.

In the chemical formula (1), $R^1$ is a hydrogen atom, —$CH_2CH_2OH$, $C_1$-$C_{10}$ aliphatic hydrocarbon group or a residue of a $C_1$-$C_{18}$ fatty acid having lost hydroxyl group. Of those groups, a $C_1$-$C_8$ aliphatic hydrocarbon group or a residue of a $C_5$-$C_{18}$ fatty acid having lost hydroxyl group is preferable for $R^1$, and a $C_1$-$C_5$ aliphatic hydrocarbon group or a residue of a $C_8$-$C_{15}$ fatty acid having lost hydroxyl group is more preferable for $R^1$.

The $C_1$-$C_{10}$ aliphatic hydrocarbon group can be either saturated or unsaturated, and can be either linear or branched. The carbon number of the aliphatic hydrocarbon group should preferably range from 1 to 10, more preferably from 1 to 8 and further more preferably from 1 to 5 for improving the bonding between sized fiber and matrix resin and stabilizing the emulsion of the resultant sizing agent. The carbon number of the fatty acid of the residue of a $C_1$-$C_{18}$ fatty acid having lost hydroxyl group should preferably range from 5 to 18 and more preferably from 8 to 15.

In the chemical formula (2), $R^2$ is a $C_1$-$C_4$ aliphatic hydrocarbon group. The $C_1$-$C_4$ aliphatic hydrocarbon group can be either saturated or unsaturated, and can be either linear or branched. The carbon number of the aliphatic hydrocarbon group should preferably range from 1 to 3, and more preferably from 1 to 2 for improving the bonding between sized fiber and matrix resin and stabilizing the emulsion of resultant sizing agent.

[Polymer Component (A)]

The sizing agent for reinforcement fibers of the present invention should preferably contain at least one polymer component (A) selected from the group consisting of aromatic polyester resins and aromatic polyester polyurethane resins for improving the film-forming performance of the resultant sizing agents and the cohesion of reinforcement fibers.

In a determination with a differential scanning calorimeter (DSC), the polymer component (A) should exhibit a glass transition temperature of at least 20 deg. C. and no endothermic peak indicating a heat of fusion 3 J/g or higher, which is caused from crystalline melting.

The glass transition temperature (deg. C.) of the polymer component (A) mentioned in the present invention is indicated at the intersection of the line drawn on the equidistant points between two lines each extended from the upper and lower base lines and the slope connecting the upper and lower base lines, where the base lines and the slope appear on the DSC curve of the polymer component (A) determined with a DSC according to JIS K 7121 as described below. The endothermic heat of fusion of the polymer component (A) is the same as that defined for the modified polypropylene resin.

The glass transition temperature of the polymer component (A) should be at least 20 deg. C. in order to control the mobility of the polymer molecules and form strong interfacial layer between a sized fiber and matrix resin to improve bonding strength between the fiber and matrix resin. The glass transition temperature of the polymer component (A) should preferably range from 25 to 200 deg. C. and more preferably from 30 to 150 deg. C.

Further, the polymer component (A) employed in the present invention should not exhibit an endothermic peak indicating 3 J/g or higher endothermic heat of fusion due to crystalline melting. In other words, the polymer component (A) employed in the present invention should not exhibit an endothermic peak due to crystalline melting, or should exhibit an endothermic peak indicating an endothermic heat of fusion less than 3 J/g. The reason of the value of the endothermic heat of fusion can be estimated as follows, though it has not been clarified.

In the crystalline region of a typical crystalline polymer where polymer chains are regularly arranged, the intermolecular force decreases with increasing polymer temperature and the state of the polymer rapidly changes from solid to liquid. The change in physical state of the polymer can be detected in a determination with DSC as a significant endothermic peak with an endothermic energy of 3 J/g or higher. Such rapid change in the physical state of the crystalline polymer can sometimes facilitate the dissolution and diffusion of a sizing agent into hot melt matrix resin, in the case that the polymer is formulated into a sizing agent for a reinforcement fiber to be molded into a fiber-reinforced composite, and can result in no contribution by the sizing agent to the bonding between a reinforcement fiber and a matrix resin.

On the contrary, the polymer component (A) employed in the present invention changes slower from solid to liquid under heating than the typical crystalline polymers mentioned above. Thus it is estimated that a sizing agent containing the polymer component (A) remains enough on fiber surface during composite molding and improves the bonding between a sized fiber and matrix resin.

The polymer component (A) employed in the present invention should preferably exhibit no endothermic peak indicating 2 J/g or higher endothermic heat of fusion due to crystalline melting (exhibit no endothermic peaks due to crystalline melting or exhibit an endothermic peak indicating less than 2 J/g of endothermic heat of fusion due to crystalline melting), more preferably exhibit no endothermic peaks indicating 1 J/g or higher endothermic heat of fusion due to crystalline melting (exhibit no endothermic peaks due to crystalline melting or exhibit an endothermic peak indicating less than 1 J/g of endothermic heat of fusion due to crystalline melting), and further more preferably exhibit no endothermic peaks.

The temperature range where the polymer component (A) exhibits no endothermic peaks indicating 3 J/g or higher endothermic heat of fusion due to crystalline melting should be 300 deg. C. from the end point of the glass transition of the polymer component (A).

Further the polymer component (A) employed in the present invention should exhibit no exothermic peaks due to polymer crystallization in determination with a DSC as well as it should exhibit no endothermic peaks caused from crystalline melting.

The polymer component (A) employed in the present invention can be produced by selecting monomers and controlling their ratio in the production of the resins. One of or at least two of the polymer component (A) employed in the present invention can be used.

[Aromatic Polyester Resin]

The aromatic polyester resin is a copolymer of a polycarboxylic acid or its anhydride and a polyol, and at least one of the polycarboxylic acid, its anhydride and a polyol is a polymer containing an aromatic compound. The aromatic polyester resin should preferably have a hydrophilic group in the molecular framework including the chain end in order to be self-emulsifiable, because a sizing agent of the present invention containing such resin can be made into aqueous emulsion without emulsifiers such as surfactants. The hydrophilic groups include, for example, polyalkylene oxide groups, sulfonate salts, carboxyl groups and their neutralization salts. The copolymer can be produced in known methods.

The polycarboxylic acids include aromatic dicarboxylic acid, sulfonate salt-containing aromatic dicarboxylic acid, aliphatic dicarboxylic acid, alicyclic dicarboxylic acid and polycarboxylic acid having at least three functional groups.

The aromatic dicarboxylic acids include phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid and phthalic anhydride.

The sulfonate salt-containing aromatic dicarboxylic acids include sulfoterephthalate salt and 5-sulfoisophthalate salt.

The aliphatic dicarboxylic acids or alicyclic dicarboxylic acids include fumaric acid, maleic acid, itaconic acid, succinic acid, adipic acid, azelaic acid, sebacic acid, dimer acid, 1,4-cyclohexane dicarboxylic acid, succinic acid anhydride and maleic acid anhydride.

The polycarboxylic acids having at least three functional groups include trimellitic acid, pyromellitic acid, trimellitic acid anhydride and pyromellitic acid anhydride.

The polyols include diols and polyols having at least three functional groups.

The diols include ethylene glycol, diethylene glycol, polyethylene glycol, propylene glycol, polypropylene glycol, polybutylene glycol, 1,3-propane diol, 1,4-butane diol, 1,6-hexane diol, neopentyl glycol, tetramethylene glycol, 1,4-cyclohexane diol, 1,4-cyclohexane dimethanol, resorcin, hydroquinone, bisphenol A and their alkylene oxide adducts.

The polyols having at least three functional groups include trimethylol propane, glycerin and pentaerythritol.

For producing the aromatic polyester resins, at least one of the polycarboxylic acid, its anhydride (which can be sometimes referred to as all of the polycarboxylic acid components) and the polyol should preferably contain an aromatic compound. Further, an aromatic dicarboxylic acid should preferably constitute 40 to 99 mole percent, and more preferably 80 to 99 mole percent of all of the polycarboxylic acid components. For making stable aqueous emulsion of the polyester copolymer resin, a sulfonate salt-containing aromatic dicarboxylic acid should preferably constitute 1 to 10 mole percent of all of the polycarboxylic acid components. Of those polycarboxylic acids exemplified above, phthalic acid, terephthalic acid, isophthalic acid, orthophthalic acid, 1,5-naphthalene dicarboxylic acid, 2,6-naphthalene dicarboxylic acid, diphenyl dicarboxylic acid, diphenoxyethane dicarboxylic acid, phthalic anhydride, sulfoterephthalate salt, and 5-sulfoisophthalate salt are preferable. Of those polyols exemplified above, ethylene glycol, diethylene glycol, polyethylene glycol, propylene glycol, tetramethylene glycol and neopentyl glycol are preferable.

The weight-average molecular weight of the polyester copolymer resin should preferably range from 3,000 to 100,000, and more preferably from 10,000 to 30,000. A polyester copolymer resin having a weight-average molecular weight less than 3,000 has poor heat resistance while a polyester copolymer resin having a weight-average molecular weight greater than 100,000 is made into unstable aqueous emulsion.

[Aromatic Polyester Polyurethane Resin]

The aromatic polyester polyurethane resin is produced in polyaddition reaction with an aromatic polyester polyol and polyisocyanate. The aromatic polyester polyurethane resin should preferably have a hydrophilic group in the molecular framework including the chain end in order to be self-emulsifiable, because a sizing agent of the present invention containing such resin can be made into aqueous emulsion without emulsifiers such as surfactants. The hydrophilic groups include, for example, polyalkylene oxide groups, sulfonate salts, carboxyl groups and their neutralization salts. The polymer can be produced in known methods.

The aromatic polyester polyol is a copolymer of a polycarboxylic acid or its anhydride and a polyol, and at least one of the polycarboxylic acid, its anhydride and a polyol has an aromatic compound. The polycarboxylic acid, its anhydride and a polyol include the compounds mentioned in the description of the aromatic polyester resin.

The polyisocyanate includes 2,4-tolylene diisocyanate, 2,6-tolylene diisocyanate, tetramethylene diisocyanate, hexamethylene diisocyanate, xylylene diisocyanate, isophorone diisocyanate and 1,5-naphthalene diisocyanate.

For producing the aromatic polyester polyurethane resin, at least one of the polycarboxylic acid, its anhydride and the polyol should preferably contain an aromatic compound. Further, an aromatic dicarboxylic acid should preferably constitute 40 to 100 mole percent, and more preferably 80 to 100 mole percent of the polycarboxylic acid or its anhydride. Preferable polycarboxylic acid and polyol are those mentioned in the description of the aromatic polyester resin. The preferable polyisocyanate includes 2,4-tolylene diisocyanate, 2,6-tolylene diisocyanate, xylylene diisocyanate, isophorone diisocyanate, and 1,5-naphthalene diisocyanate.

The weight-average molecular weight of the aromatic polyester polyurethane resin should preferably range from 3,000 to 100,000, and more preferably from 10,000 to 50,000. An aromatic polyester polyurethane resin having a weight-average molecular weight less than 3,000 has poor heat resistance while an aromatic polyester polyurethane resin having a weight-average molecular weight greater than 100,000 is made into unstable aqueous emulsion.

[Sizing Agent]

The sizing agent of the present invention is applied to reinforcement fiber used to reinforce thermoplastic matrix resins, and essentially contains a neutralization product of the modified polypropylene resin and the amine compound mentioned above. The method for producing the neutralization product is not specifically restricted and known methods can be employed. Those methods include, for example, a method in which the modified polypropylene resin and amine compound mentioned above are added to warm water with agitation to be dispersed, emulsified or dissolved, and a method in which the components are mixed, heated to a temperature above their softening points, agitated in a homogenizer, mixer or ball mill with mechanical sear and emulsified through phase conversion with water gradually added.

The sizing agent for reinforcement fibers of the present invention containing the neutralization product mentioned above should preferably be formulated by blending 10 to 90 weight percent of the modified polypropylene resin and 1 to 20 weight percent of the amine compound in the whole of the nonvolatile component of the sizing agent.

The ratio of the modified polypropylene resin should preferably range from 30 to 85 weight percent, and more preferably from 50 to 80 weight percent. A ratio of the modified polypropylene resin lower than 10 weight percent leads to insufficient amount of the modified polypropylene resin on reinforcement fiber and can fail to improve the bonding between sized fiber and matrix resin. A ratio of the modified polypropylene resin higher than 90 weight percent can decrease the cohesion of sized fiber.

The ratio of the amine compound should preferably range from 3 to 15 weight percent, and more preferably from 5 to 12 weight percent. A ratio of the amine compound lower than 1 weight percent is not effective enough to decrease the crystalline region of the modified polypropylene resin and the resultant sizing agent can fail to improve the bonding between sized reinforcement fiber and matrix resin. A ratio of the amine compound higher than 20 weight percent can make the sizing agent difficult to be dispersed in water.

The nonvolatile component of the sizing agent for reinforcement fibers of the present invention should exhibit an endothermic heat of fusion of 50 J/g or lower in determination with a DSC, and the endothermic heat of fusion should preferably range from 1 to 48 J/g, more preferably from 5 to 45 J/g, and further more preferably from 10 to 40 J/g. An endothermic heat of fusion of the nonvolatile component higher than 50 J/g implies that the neutralization product of the modified polypropylene resin and the amine compound contains excessive crystalline region in the molecular structure, and a sizing agent containing such neutralization product does not contribute to the bonding between sized fiber and matrix resin. The nonvolatile component of a sizing agent mentioned in the present invention is defined to be the absolute dry component remaining after heating the sizing agent at 105 deg. C. to a constant weight to remove solvents and volatiles. The endothermic heat of fusion is the same as that defined in the description of the modified polypropylene resin.

The sizing agent of the present invention exhibits good drying efficiency in evaporating water in a drying process after it is applied onto fiber. The good drying efficiency contributes to shortened drying time and increased processing speed. In addition, the good drying efficiency prevents the sizing agent from thermal degradation which hinders the bonding between sized fiber and matrix resin.

A sizing agent containing 5.0 weight percent of nonvolatile component should preferably result in at least 75 weight percent of volatiles, more preferably at least 78 weight percent and further more preferably at least 80 weight percent, in determination with an infrared moisture meter where 2.0 g of the sizing agent is heated for 10 minutes.

Further the sizing agent of the present invention should preferably contain the polymer component (A) in an amount ranging from 5 to 80 weight percent of the nonvolatile component of the sizing agent, more preferably from 10 to 75 weight percent, further preferably from 20 to 70 weight percent, and further more preferably from 30 to 60 weight percent. A sizing agent containing the polymer component (A) in an amount mentioned above forms a good film of the nonvolatile component on fiber to attain excellent bonding between sized fiber and matrix resin and forms durable interfacial layer which firmly bonds sized fiber and matrix resin.

The sizing agent of the present invention can be applied to fiber from dispersion or solution in organic solvents, such as acetone or methylethyl ketone. However, the sizing agent should preferably contain water, in other words, it should preferably be made into an aqueous dispersion or aqueous solution in which the neutralization product and polymer component (A) are dispersed or dissolved, for the safety of workers using the sizing agent, prevention of disaster including fires, and prevention of the pollution in natural environment.

The method for making aqueous dispersion or solution of the sizing agent of the present invention is not specifically restricted, and known methods can be employed. Those methods include, for example, a method in which the components constituting the sizing agent are added to warm water with agitation to be dispersed, emulsified or dissolved, and a method in which the components are mixed, heated to a temperature above their softening points, agitated in a homogenizer, mixer or ball mill with mechanical sear and emulsified through phase conversion with water gradually added.

The aqueous dispersion or solution mentioned above can contain a solvent other than water, such as an organic solvent, in an amount which will not adversely affect the advantage of the aqueous dispersion or solution, for the convenience in handling the dispersion or solution in manufacturing process and for improving the stability of the dispersion or solution during storage.

The organic solvent include alcohols such as methyl alcohol, ethyl alcohol and isopropyl alcohol; glycols and glycol ethers such as ethylene glycol, propylene glycol, ethylene glycol monoisopropyl ether and ethylene glycol monobutyl ether; and ketones such as acetone and methylethyl ketone. The amount of the organic solvent, which depends on the variant of the solvent, should preferably be not greater than 100% and more preferably not greater than 50% of the amount of the nonvolatile component of the sizing agent in order not to adversely affect the advantage of the aqueous dispersion or solution.

The concentration of the nonvolatile component of the sizing agent of the present invention produced in a form of an aqueous dispersion or solution is not specifically restricted, and determined according to the ingredients of the nonvolatile component in order to make stable aqueous dispersion having a viscosity convenient for use. The concentration of the nonvolatile component should preferably be at least 10 weight percent, more preferably range from 20 to 60 weight percent, and further more preferably from 30 to 50 weight percent, considering the transportation cost of the sizing agent.

The components constituting the sizing agent of the present invention, other than those described above, include for example, surfactants, lubricants, antioxidants, flame retarders, antiseptics, crystal-nucleation agents and antifoam agents. One of or a combination of at least two of those components can be employed.

Of those components, surfactants function as emulsifiers for water-insoluble or poorly water-soluble resins contained in the sizing agent of the present invention, and efficiently emulsify the resins in water. The ratio by weight of the surfactants should preferably range from 5 to 40 weight percent, more preferably from 10 to 30 weight percent, and further more preferably from 15 to 25 weight percent in the whole of the nonvolatile component of a sizing agent.

The surfactants are not specifically restricted and can be selected from known surfactants including nonionic surfactants, anionic surfactants, cationic surfactants and amphoteric surfactants. One of or combination of at least two of the surfactants can be employed.

The nonionic surfactants include, for example, nonionic surfactants of alkylene oxide adducts produced by adding alkylene oxide (which can be a combination of at least two alkylene oxides) such as ethylene oxide or propylene oxide to higher alcohols, higher fatty acids, alkyl phenols, styrenated phenols, benzyl phenol, sorbitan, sorbitan ester, castor oil and hydrogenated castor oil; adducts produced by adding higher fatty acids to polyalkylene glycols; and ethylene oxide-propylene oxide copolymers.

The anionic surfactants include, for example, carboxylic acids, carboxylate salts, sulfate salts of higher alcohols and higher alcohol ethers, sulfonate salts, and phosphate salts of higher alcohols and higher alcohol ethers.

The cationic surfactants include, for example, cationic surfactants of quaternary ammonium salts (lauryl trimethyl ammonium chloride, oleyl methylethyl ammonium ethosulfate, etc.), and cationic surfactants of amine salts (polyoxyethylene laurylamine lactate salt, etc.).

The amphoteric surfactants include, for example, amino acid type amphoteric surfactants (sodium laurylamino propionate, etc.) and betaine type amphoteric surfactants (stearyl dimethyl betaine, lauryl dihydroxyethyl betaine, etc.).

In addition, the sizing agent for reinforcement fibers of the present invention should not substantially contain modified polyolefin resins (hereinafter referred to as the modified polyolefin resin (B)) other than the modified polypropylene resin mentioned above, because the modified polyolefin resin (B) adversely affects the compatibility of the sizing agent to matrix resin to deteriorate the bonding between sized fiber and matrix resin. Specifically, the ratio of the modified polyolefin resin (B) in the nonvolatile component of the sizing agent should preferably be not higher than 10 weight percent, more preferably not higher than 5 weight percent, further preferably not higher than 2 weight percent, and further more preferably 0 weight percent.

The modified polyolefin resin (B) (modified polyolefin resin other than the modified polypropylene resin mentioned above) is a copolymer containing olefin monomers and unsaturated carboxylic acids. The modified polyolefin resin (B) contains no propylene or some amount of propylene which constitutes, in combination with unsaturated fatty acids, less than 90 mole percent of the total monomers reacted into the copolymer. In other words, the modified polyolefin resin (B) is a copolymer containing olefin monomers and unsaturated carboxylic acids and contains olefin monomers other than propylene in an amount higher than 10 mole percent of the total monomers reacted into the copolymer. The olefin monomers other than propylene and unsaturated fatty acids are those mentioned in the description for the modified polypropylene resin mentioned above. The modified polyolefin resin (B) includes neutralization products which have been neutralized with the amine compound mentioned above, other amine compounds, sodium hydroxide and basic compounds such as sodium hydroxide.

[Synthetic Fiber Strand]

The synthetic fiber strand of the present invention is manufactured by applying the sizing agent for reinforcement fibers to a base synthetic fiber strand and used to reinforce thermoplastic matrix resin.

The manufacturing method of the synthetic fiber strand of the present invention contains a sizing process where the sizing agent is applied to a base synthetic fiber strand and the sized fiber strand is dried.

The method for applying the sizing agent to a base synthetic fiber strand is not specifically restricted, and the sizing agent can be applied to a base synthetic fiber strand in known methods including kiss roll method, dipping with rollers, and spraying. Of those methods, dipping with rollers is preferable because of uniform size application on the base synthetic fiber strand.

The drying method for the sized fiber strand is not specifically restricted, and the sized fiber strand can be heated and dried with heater rollers, hot airs, or hot plates.

For applying the sizing agent of the present invention to a base synthetic fiber strand, all of the components of the sizing agent can be blended before applying to the base synthetic fiber strand, or the components can be separately applied to the base synthetic fiber strand at two or more steps. Furthermore, thermosetting resins such as epoxy resins, vinyl ester resins and phenol resins; and/or thermoplastic resins other than the polymer components employed in the present invention such as urethane resins, polyester resins, nylon resins and acrylate resins can be applied to the base synthetic fiber strand in an amount which does not deteriorate the effect of the present invention.

The synthetic fiber strand of the present invention is used as a reinforcement fiber for composites containing thermoplastic resins as the matrix. The form of the reinforcement fiber can be continuous filament or short fiber cut into a desirable length.

The amount of the nonvolatile component of the sizing agent applied to a base synthetic fiber strand can be selected according to each requirement to impart desirable performance of the sized synthetic fiber strand. The preferable amount should range from 0.1 to 20 weight percent of the base synthetic fiber strand. For applying the sizing agent to continuous synthetic fiber strand, the amount of the nonvolatile component of the sizing agent should preferably range from 0.1 to 10 weight percent, and more preferably from 0.5 to 5 weight percent of the base synthetic fiber strand. For applying the sizing agent to short fiber cut into a desirable length, the amount of the nonvolatile component of the sizing agent should preferably range from 0.5 to 20 weight percent, and more preferably from 1 to 10 weight percent of the fiber.

Insufficient amount of the sizing agent on fiber can fail to achieve the effect of the present invention on the impregnation of reinforcement fiber with matrix resin and the bonding between reinforcement fiber and matrix resin. Further the insufficient amount of the sizing agent on fiber can fail to impart sufficient cohesion to synthetic fiber strand to cause poor handling property of the fiber strand. On the other hand, excessive amount of the sizing agent on fiber is not preferable, because synthetic fiber strand can become too rigid to cause poor handling property and can be impregnated insufficiently with matrix resins in composite molding.

The base synthetic fibers to be applied with the sizing agent of the present invention include inorganic fibers such as carbon fiber, glass fiber and ceramic fiber; and organic fibers such as aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber. Of those fibers, at least one selected from the group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber is preferable, considering the property of resultant fiber-reinforced composite.

[Fiber Reinforced Composite]

The fiber-reinforced composite of the present invention contains a thermoplastic matrix resin and the synthetic fiber strand mentioned above as the reinforcement fiber. The synthetic fiber strand applied with the sizing agent of the present invention has good affinity to thermoplastic matrix resins and is manufactured into fiber-reinforced composite in which the reinforcement fiber and a matrix resin are bonded firmly.

The matrix resin mentioned here is the matrix of a fiber-reinforced composite, and the thermoplastic matrix resin mentioned here is a matrix resin consisting of one or at least two thermoplastic resins. The thermoplastic matrix resin is not specifically restricted and includes polyolefin resins, nylon resins, polycarbonate resins, polyester resins, polyacetal resins, ABS resins, phenoxy resins, polymethyl methacrylate resins, polyphenylene sulfide resins, polyetherimide resins and polyether ketone resins. Of those thermoplastic resins, polyolefin resins are preferable for their good bonding with fibers applied with the sizing agent of the present invention. The part or whole of the thermoplastic matrix resin can be modified for the purpose of improving the bonding between the matrix resin and synthetic fiber strand.

The manufacturing method of the fiber-reinforced composite is not specifically restricted, and various known methods including injection molding with compound containing chopped fiber or filament pellet, pressure molding with UD (unidirectional) sheet or fabric sheet, and molding with wound filament.

The amount of a synthetic fiber strand contained in a fiber-reinforced composite is not specifically restricted and can be selected according to fiber variant, fiber form and the variant of thermoplastic matrix resin. The amount of a synthetic fiber strand contained in a fiber-reinforced composite should preferably range from 5 to 70 weight percent, and more preferably from 20 to 60 weight percent of the resultant fiber-reinforced composite.

EXAMPLES

The present invention is specifically explained with the following examples, though the present invention is not restricted within the scope of the examples. The percent mentioned in the following examples means "weight percent" unless otherwise specified. The properties were measured in the methods described below.

Glass Transition Temperature

The glass transition temperature of about 10 mg of a sample was determined with a differential scanning calorimeter (DSC, the Jade DSC Lab system, manufactured by Perkin Elmer Instruments) according to JIS K 7121 with elevating temperature at the rate of 10 deg. C./min. Specifically 10±1 mg of a sample was accurately weighed and set in the differential scanning calorimeter, and the sample was heated under the elevating temperature up to the temperature 30 deg. C. higher than the melting temperature of the sample previously determined. Then the temperature of the sample was lowered to the temperature 50 deg. C. lower than the glass transition temperature, Tg, of the sample previously determined, and then raised to 300 deg. C. at the rate of 10 deg. C./min. The resultant DSC curve contained a stepwise shift where two lines were extended from each of the upper and lower base lines, and the glass transition point, Tg (deg. C.), of the sample, was indicated by the intersection of the line drawn on the equidistant points between the two extended lines and the slope connecting the upper and lower base lines.
Endothermic Heat of Fusion According to JIS K 7121 and JIS K 7122, the endothermic heat of fusion (J/g) of a sample was calculated from the value of integral of the area surrounded by the endothermic peak on the DSC curve of the sample obtained in the determination of the glass transition temperature and the line drawn between the points where the peak starts from and returns to the base line of the DSC curve.
Bonding The bonding between a fiber strand and a matrix resin was measured in the microdroplet method with an evaluation equipment for the interfacial properties of composite materials, HM 410 (manufactured by Tohei Sangyo Co., Ltd.).

Carbon fiber filament was drawn out from each of the carbon fiber strands produced in Examples and Comparative examples, and set in the evaluation equipment for the interfacial properties of composite materials. J-900GP (produced by Idemitsu Petrochemical Co., Ltd.), a polypropylene resin mixture, was melted on the equipment, and a drop of the melted resin mixture was formed on the carbon fiber filament in the equipment and cooled down well at room temperature to be prepared into a sample for determining the bonding between the carbon fiber filament and the resin. The cooled sample was again set in the equipment and the drop was pinched with the blades of the equipment. The carbon fiber filament in the equipment was driven at a speed of 0.06 mm/min to determine the maximum pullout load, F, required for pulling out the drop from the carbon fiber filament.

The interfacial shearing strength, $\tau$, was calculated by the following expression to evaluate the bonding between the carbon fiber filament and the polypropylene resin.

Interfacial shearing strength, $\tau(MPa) = F/\pi dl$ where F is the maximum pullout load, d is the diameter of the carbon fiber filament, and l is the drop diameter in the pulling direction.
Drying Efficiency of Sizing Agent The drying efficiency of a sizing agent containing 5.0 weight percent of nonvolatile component was evaluated by determining the amount of the volatile component (weight percent) in 2.0 g of the sizing agent after heating at 110 deg. C. with radiation from infrared lamps for 10 minutes in an infrared moisture balance (FD-230, manufactured by Kett Electric Laboratory).
Film Forming Performance of the Nonvolatile Component of a Sizing Agent A sizing agent was placed in an aluminum tray in an amount containing 1.0 g of nonvolatile component, and dried at 105 deg. C. for 3 hours. The resultant film was visually inspected and evaluated according to the following criteria.

Film was formed: ◎
Brittle film was formed: ○
No film was formed and brittle solid was left: △
Cohesion of Chopped Carbon Fiber The cohesion of chopped carbon fiber was determined by dividing the bulk density of a chopped carbon fiber after agitation in a mixer at 400 rpm for 3 minutes by the bulk density of the carbon fiber before the agitation. Greater value indicates poorer fiber cohesion. The bulk density of chopped carbon fiber was determined in the following procedure.

Bulk density of chopped carbon fiber: In a 500-ml measuring cylinder, 70 g of chopped carbon fiber was transferred. The measuring cylinder was shaken vertically 60 times for 1 minute and the volume of the carbon fiber after the shaking was read. The weight of the carbon fiber, 70 g, was divided by the volume to determine the bulk density.

Production of Modified Polypropylene Resin and Modified Polyolefin Resin

Example of Production A1

A polypropylene resin was heated and melted in an autoclave with agitation. Maleic acid anhydride was added to the resin to react the polypropylene with the maleic acid anhydride in graft polymerization to produce a modified polypropylene resin (1) consisting of 97.8 mole percent of propylene and 2.2 mole percent of maleic acid anhydride, exhibiting the endothermic heat of fusion of 58.0 J/g and the acid value of 54 KOHmg/g, and having the weight-average molecular weight of 30,000.

Example of Production A2

A polypropylene resin was heated and melted in an autoclave with agitation. Maleic acid anhydride was added to the resin to react the polypropylene with the maleic acid anhydride in graft polymerization to produce a modified polypropylene resin (2) consisting of 98.3 mole percent of propylene and 1.7 mole percent of maleic acid anhydride, exhibiting the endothermic heat of fusion of 62.8 J/g and the acid value of 43 KOHmg/g, and having the weight-average molecular weight of 35,000.

Example of Production A3

A polypropylene resin was heated and melted in an autoclave with agitation. Maleic acid anhydride was added to the resin to react the polypropylene with the maleic acid anhydride in graft polymerization to produce a modified polypropylene resin (3) consisting of 97.0 mole percent of propylene and 3.0 mole percent of maleic acid anhydride, exhibiting the endothermic heat of fusion of 51.4 J/g and the acid value of 58 KOHmg/g, and having the weight-average molecular weight of 28,000.

Example of Production A4

An ethylene-propylene copolymer resin (containing 5 mole percent of ethylene and 95 mole percent of propylene) was heated and melted in an autoclave with agitation. Maleic acid anhydride was added to the resin to react the ethylene-propylene copolymer resin with the maleic acid anhydride in graft polymerization to produce a modified polypropylene resin (4) consisting of 98.0 mole percent of ethylene-propylene copolymer and 2.0 mole percent of maleic acid anhydride, exhibiting the endothermic heat of fusion of 67.8 J/g and the acid value of 50 KOHmg/g, and having the weight-average molecular weight of 31,000.

Example of Production A5

A polypropylene resin was heated and melted in an autoclave with agitation. Maleic acid anhydride was added to the resin to react the polypropylene with the maleic acid anhydride in graft polymerization to produce a modified polypropylene resin (5) consisting of 99.0 mole percent of propylene and 1.0 mole percent of maleic acid anhydride, exhibiting the endothermic heat of fusion of 82.2 J/g and the acid value of 26 KOHmg/g, and having the weight-average molecular weight of 40,000.

Example of Production A6

An ethylene-propylene copolymer resin (containing 15 mole percent of ethylene and 85 mole percent of propylene) was heated and melted in an autoclave with agitation. Maleic acid anhydride was added to the resin to react the ethylene-propylene copolymer resin with the maleic acid anhydride in graft polymerization to produce a modified polyolefin resin (6) consisting of 98.2 mole percent of ethylene-propylene copolymer and 1.8 mole percent of maleic acid anhydride, exhibiting the endothermic heat of fusion of 71.0 J/g and the acid value of 45 KOHmg/g, and having the weight-average molecular weight of 58,000.

Example of Production A7

An propylene-ethylene-butene-acrylic acid copolymer (containing 68 mole percent of propylene, 8 mole percent of ethylene, 22 mole percent of butene and 2 mole percent of acrylic acid) was heated and melted in an autoclave with agitation. Maleic acid anhydride was added to the resin to react the propylene-ethylene-butene-acrylic acid copolymer resin with the maleic acid anhydride in graft polymerization to produce a modified polyolefin resin (7) consisting of 95.7 mole percent of propylene-ethylene-butene-acrylic acid copolymer and 4.3 mole percent of maleic acid anhydride, exhibiting the endothermic heat of fusion of 8.8 J/g and the acid value of 50 KOHmg/g, and having the weight-average molecular weight of 70,000.

Production of Aqueous Emulsions of (Neutralized) Modified Polypropylene Resin and Modified Polyolefin Resin Example of Production B1

In an autoclave equipped with an agitator, 222 parts of the modified polypropylene resin (1), 52 parts of POE (8) oleyl ether and 26 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-1, containing 30 weight percent of nonvolatile component.

Example of Production B2

In an autoclave equipped with an agitator, 222 parts of the modified polypropylene resin (1), 52 parts of POE (8) oleyl ether and 26 parts of t-butyl diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-2, containing 30 weight percent of nonvolatile component.

Example of Production B3

In an autoclave equipped with an agitator, 222 parts of the modified polypropylene resin (1), 52 parts of POE (8) oleyl ether and 26 parts of n-butyl diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-3, containing 30 weight percent of nonvolatile component.

Example of Production B4

In an autoclave equipped with an agitator, 222 parts of the modified polypropylene resin (1), 52 parts of POE (8) oleyl ether and 26 parts of N-methyldiethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-4, containing 30 weight percent of nonvolatile component.

Example of Production B5

In an autoclave equipped with an agitator, 222 parts of the modified polypropylene resin (1), 52 parts of POE (8) oleyl ether and 26 parts of N-ethyldiethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-5, containing 30 weight percent of nonvolatile component.

Example of Production B6

In an autoclave equipped with an agitator, 224 parts of the modified polypropylene resin (1), 52 parts of POE (8) oleyl ether and 24 parts of N-aminoethylethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-6, containing 30 weight percent of nonvolatile component.

Example of Production B7

In an autoclave equipped with an agitator, 217 parts of the modified polypropylene resin (1), 50 parts of POE (8) oleyl ether and 33 parts of triethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-7, containing 30 weight percent of nonvolatile component.

Example of Production B8

In an autoclave equipped with an agitator, 208 parts of the modified polypropylene resin (1), 49 parts of POE (8) oleyl ether and 43 parts of lauric acid diethanolamide were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-8, containing 30 weight percent of nonvolatile component.

Example of Production B9

In an autoclave equipped with an agitator, 224 parts of the modified polypropylene resin (2), 53 parts of POE (8) oleyl ether and 23 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-9, containing 30 weight percent of nonvolatile component.

Example of Production B10

In an autoclave equipped with an agitator, 221 parts of the modified polypropylene resin (3), 51 parts of POE (8) oleyl ether and 28 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-10, containing 30 weight percent of nonvolatile component.

Example of Production B11

In an autoclave equipped with an agitator, 222 parts of the modified polypropylene resin (4), 52 parts of POE (8) oleyl ether and 26 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-11, containing 30 weight percent of nonvolatile component.

Example of Production B12

In an autoclave equipped with an agitator, 225 parts of the modified polypropylene resin (1), 57 parts of POE (8) oleyl ether and 18 parts of ammonia were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-12, containing 30 weight percent of nonvolatile component.

Example of Production B13

In an autoclave equipped with an agitator, 222 parts of the modified polypropylene resin (1), 58 parts of POE (8) oleyl ether and 20 parts of triethylamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-13, containing 30 weight percent of nonvolatile component.

Example of Production B14

In an autoclave equipped with an agitator, 221 parts of the modified polypropylene resin (1), 51 parts of POE (8) oleyl ether and 28 parts of dimethylethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-14, containing 30 weight percent of nonvolatile component.

Example of Production B15

In an autoclave equipped with an agitator, 224 parts of the modified polypropylene resin (1), 52 parts of POE (8) oleyl ether and 24 parts of monoethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-15, containing 30 weight percent of nonvolatile component.

Example of Production B16

In an autoclave equipped with an agitator, 228 parts of the modified polypropylene resin (1), 57 parts of POE (8) oleyl ether and 15 parts of potassium hydroxide were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-16, containing 30 weight percent of nonvolatile component.

Example of Production B17

In an autoclave equipped with an agitator, 228 parts of the modified polypropylene resin (1), 57 parts of POE (8) oleyl ether and 15 parts of sodium hydroxide were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-17, containing 30 weight percent of nonvolatile component.

Example of Production B18

In an autoclave equipped with an agitator, 226 parts of the modified polypropylene resin (5), 53 parts of POE (8) oleyl ether and 21 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-18, containing 30 weight percent of nonvolatile component.

Example of Production B19

In an autoclave equipped with an agitator, 226 parts of the modified polyolefin resin (6), 53 parts of POE (8) oleyl ether and 21 parts of diethanolamine were charged and heated up to 180 to 190 deg. C. with agitation under nitrogen flux. Then 700 parts of water was gradually added with agitation and the agitation was continued at 180 to 190 deg. C. for 2 hours to uniformly dissolve the mixture. Then the solution was cooled down to room temperature, and the amount of the water in the mixture was adjusted to prepare the aqueous emulsion, PP-19, containing 30 weight percent of nonvolatile component.

Example of Production B20

In an autoclave equipped with an agitator, 226 parts of the modified polyolefin resin (7), 53 parts of POE (8) oleyl ether and 21 parts of diethanolamine were charged and heated up to 170 to 180 deg. C. with agitation under nitrogen flux. Then 700 parts of water was gradually added with agitation and the agitation was continued at 170 to 180 deg. C. for 2 hours to uniformly dissolve the mixture. Then the solution was cooled down to room temperature, and the amount of the water in the mixture was adjusted to prepare the aqueous emulsion, PP-20, containing 30 weight percent of nonvolatile component.

Example of Production B21

In an autoclave equipped with an agitator, 191 parts of the modified polyolefin resin (6), 34 parts of the modified polyolefin resin (7), 53 parts of POE (8) oleyl ether and 22 parts of diethanolamine were charged and heated up to 180 to 190 deg. C. with agitation under nitrogen flux. Then 700 parts of water was gradually added with agitation and the agitation was continued at 180 to 190 deg. C. for 2 hours to uniformly dissolve the mixture. Then the solution was cooled down to room temperature, and the amount of the water in the mixture was adjusted to prepare the aqueous emulsion, PP-21, containing 30 weight percent of nonvolatile component.

The boiling point, the number of hydroxyl groups and the number of amino groups of the neutralizers employed for producing the aqueous emulsions, PP-1 to PP-21, are shown in Table 1.

TABLE 1

| Neutralizer | | Boiling point (deg. C.) | Number of hydroxyl groups | Number of amino groups |
|---|---|---|---|---|
| Amine compound | Diethanolamine | 268.8 | 2 | 1 |
| | t-butyldiethanolamine | 270.4 | 2 | 1 |
| | n-butyldiethanolamine | 265.0 | 2 | 1 |
| | N-methyldiethanolamine | 247.2 | 2 | 1 |
| | N-ethyldiethanolamine | 247.0 | 2 | 1 |
| | N-aminoethylethanolamine | 243.7 | 1 | 2 |
| | Triethanolamine | 335.0 | 3 | 1 |
| | Laurie acid diethanol amide | 255.0 | 2 | 1 |
| | Ammonia | −33.3 | 0 | 1 |
| | Triethylamine | 89.7 | 0 | 1 |
| | Dimethylethanolamine | 134.6 | 1 | 1 |
| | Monoethanolamine | 170.0 | 1 | 1 |
| Inorganic compound | Potassium hydroxide | 1320 | 1 | 0 |
| | Sodium hydroxide | 1390 | 1 | 0 |

Production of Aromatic Polyester Resin and Aromatic Polyester Polyurethane Resin Example of Production C1

In a reactor purged with nitrogen, 950 parts of dimethyl isophthalate, 1000 parts of diethylene glycol, 0.5 parts of zinc acetate and 0.5 parts of antimony trioxide were charged and reacted in transesterification at 140 to 220 deg. C. for 3 hours. Then 30 parts of 5-sodium sulfo isophthalic acid was added to perform esterification at 220 to 260 deg. C. for 1 hour followed with condensation polymerization at 240 to 270 deg. C. under reduced pressure for 2 hours. The resultant aromatic polyester resin was analyzed with NMR and found to have consisted of the following components.

Isophthalic acid: 49 mole percent
Diethylene glycol: 50 mole percent
5-sodium sulfo isophthalic acid: 1 mole percent Then 200 parts of the resultant aromatic polyester resin and 100 parts of ethylene glycol monobutyl ether were charged in an emulsification equipment and homogenized with agitation at 150 to 170 deg. C. Then 700 parts of water was gradually added to the mixture to prepare aqueous emulsion of the aromatic polyester resin, PE-1, containing 20 weight percent of nonvolatile component.

Example of Production C2

In a reactor purged with nitrogen, 498 parts of terephthalic acid, 332 parts of isophthalic acid, 248 parts of ethylene glycol, 106 parts of diethylene glycol, 45 parts of tetramethylene glycol and 0.2 parts of dibutyl tin oxide were charged and reacted in esterification at 190 to 240 deg. C. for 10 hours to produce an aromatic polyester polyol. Then 1000 parts of the resultant aromatic polyester polyol was dehydrated at 120 deg. C. under reduced pressure and cooled down to 80 deg. C., and 680 parts of methylethyl ketone was added to dissolve the aromatic polyester polyol with agitation. Then 218 parts of isophorone diisocyanate and 67 parts of 2,2-dimethylol propionic acid as a chain extender were added to perform urethanation at 70 deg. C. for 12 hours. The reaction product was cooled down to 40 deg. C. and neutralized with 97 parts of 13.6-% aqueous ammonia, and 2950 parts of water was added to make aqueous emulsion. The resultant aqueous emulsion was heated up to 65 deg. C. under reduced pressure to distill away methylethyl ketone, and the water content was adjusted to prepare aqueous emulsion of the aromatic polyester polyurethane resin, PU-1, containing 30 weight percent of nonvolatile component.

The aqueous emulsions from PP-1 to PP-21, the mixture of the aqueous emulsions of PP-1 and PE-1 (PP-1/PE-1), and the mixture of the aqueous emulsions of PP-1 and PU-1 (PP-1/PU-1) were heated at 105 deg. C. to remove solvents and made into absolute dry matters. The endothermic heats of fusion of those dry matters were determined with a DSC, and the results are shown in Table 2. The ratios given to PP-1/PE-1 and PP-1/PU-1 in Table 2 represent the weight ratio of the nonvolatile component of those emulsions.

TABLE 2

| Sizing agent | Endothermic heat of fusion of nonvolatile component (J/g) |
|---|---|
| PP-1 | 31.6 |
| PP-2 | 36.4 |
| PP-3 | 34.5 |
| PP-4 | 36.8 |
| PP-5 | 37.2 |
| PP-6 | 46.2 |
| PP-7 | 37.0 |
| PP-8 | 39.4 |
| PP-9 | 38.8 |
| PP-10 | 30.2 |
| PP-11 | 41.5 |
| PP-12 | 58.7 |
| PP-13 | 56.1 |
| PP-14 | 54.8 |
| PP-15 | 53.9 |
| PP-16 | 32.1 |
| PP-17 | 35.6 |
| PP-18 | 54.3 |
| PP-19 | 58.6 |
| PP-20 | no endothermic peaks |
| PP-21 | 40.8 |
| PP-1/PE-1 = 80:20 | 30.0 |
| PP-1/PE-1 = 70:30 | 25.8 |
| PP-1/PU-1 = 80:20 | 29.1 |
| PP-1/PU-1 = 70:30 | 25.1 |

Example 1

PP-1 was diluted with water to be made into a size emulsion containing 15 weight percent of nonvolatile component. Carbon fiber strand (800 tex, 12000 filament count) free of sizing agents was immersed in and impregnated with the emulsion, dried in hot air at 105 deg. C. for 15 minutes, and made into a carbon fiber strand applied with the sizing agent in the theoretical amount of 5%. The bonding of the carbon fiber strand with a matrix resin was evaluated in the method mentioned above, and the results are shown in Table 3.

Examples 2 to 15 and Comparative Examples 1 to 10

Carbon fiber strands applied with sizing agents were prepared in the same manner as that in Example 1, except that the emulsions of sizing agents containing 15 weight percent nonvolatile component were prepared with the components shown in Tables 3 to 5. The properties of the resultant carbon fiber strands are shown in Tables 3 to 5. The numbers in the cells in the rows of the "Nonvolatile component of sizing agent" in Tables 3 to 5 represent the ratio of the nonvolatile component of each of the emulsions PP-1 to PP-21, PE-1 and PU-1 to the whole of nonvolatile component in a sizing agent.

TABLE 3

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Nonvolatile component of sizing agent (%) | PP-1 | 100 | | | | | | | | | | |
| | PP-2 | | 100 | | | | | | | | | |
| | PP-3 | | | 100 | | | | | | | | |
| | PP-4 | | | | 100 | | | | | | | |
| | PP-5 | | | | | 100 | | | | | | |
| | PP-6 | | | | | | 100 | | | | | |
| | PP-7 | | | | | | | 100 | | | | |
| | PP-8 | | | | | | | | 100 | | | |
| | PP-9 | | | | | | | | | 100 | | |
| | PP-10 | | | | | | | | | | 100 | |
| | PP-11 | | | | | | | | | | | 100 |
| Bonding (MPa) | | 20.9 | 19.8 | 20.1 | 19.9 | 20.4 | 17.6 | 18.8 | 16.1 | 18.1 | 19.2 | 15.8 |
| Drying efficiency (%) | | 86.0 | 83.5 | 82.7 | 85.9 | 81.3 | 85.5 | 82.1 | 80.1 | 85.4 | 84.0 | 83.3 |
| Film-forming | | ○ | ○ | ○ | ○ | ○ | Δ | ○ | ○ | ○ | ○ | ○ |
| Cohesion | | 1.06 | 1.05 | 1.07 | 1.06 | 1.05 | 1.08 | 1.06 | 1.05 | 1.05 | 1.06 | 1.05 |

TABLE 4

| | | Examples | | | |
|---|---|---|---|---|---|
| | | 12 | 13 | 14 | 15 |
| Nonvolatile component of sizing agent (%) | PP-1 | 80 | 70 | 80 | 70 |
| | PE-1 | 20 | 30 | | |
| | PU-1 | | | 20 | 30 |
| Bonding (MPa) | | 18.5 | 18.1 | 18.4 | 18.3 |
| Drying efficiency (%) | | 81.4 | 94.7 | 89.0 | 89.1 |
| Film-forming | | ◎ | ◎ | ◎ | ◎ |
| Cohesion | | 1.02 | 1.03 | 1.02 | 1.01 |

TABLE 5

|  |  | Comparative examples | | | | | | | | | |
|---|---|---|---|---|---|---|---|---|---|---|---|
|  |  | 1 | 2 | 3 | 4 | 5 | 6 | 7 | 8 | 9 | 10 |
| Nonvolatile component of sizing agent (%) | PP-12 | 100 |  |  |  |  |  |  |  |  |  |
|  | PP-13 |  | 100 |  |  |  |  |  |  |  |  |
|  | PP-14 |  |  | 100 |  |  |  |  |  |  |  |
|  | PP-15 |  |  |  | 100 |  |  |  |  |  |  |
|  | PP-16 |  |  |  |  | 100 |  |  |  |  |  |
|  | PP-17 |  |  |  |  |  | 100 |  |  |  |  |
|  | PP-18 |  |  |  |  |  |  | 100 |  |  |  |
|  | PP-19 |  |  |  |  |  |  |  | 100 |  |  |
|  | PP-20 |  |  |  |  |  |  |  |  | 100 |  |
|  | PP-21 |  |  |  |  |  |  |  |  |  | 100 |
| Bonding (MPa) |  | 10.8 | 11.2 | 11.8 | 10.7 | 10.0 | 10.3 | 10.5 | 10.9 | 8.6 | 12.1 |
| Drying efficiency (%) |  | 85.4 | 87.6 | 90.0 | 86.3 | 70.5 | 71.5 | 94.7 | 84.0 | 76.1 | 79.3 |
| Film-forming |  | Δ | Δ | Δ | Δ | ○ | ○ | Δ | Δ | ⊚ | Δ |
| Cohesion |  | 1.08 | 1.07 | 1.09 | 1.09 | 1.05 | 1.05 | 1.08 | 1.08 | 1.02 | 1.09 |

As clearly shown in Tables 3 to 5, the sizing agents in Examples resulted in better bonding between sized carbon fibers and matrix resins than the sizing agents in Comparative examples.

INDUSTRIAL APPLICABILITY

Fiber reinforced composites manufactured by reinforcing thermoplastic matrix resins with reinforcement fibers are applied to various uses including automotive application, aerospace application, sporting and leisure goods, and general industries. Reinforcement fibers include inorganic fibers such as carbon fiber, glass fiber and ceramic fiber; and organic fibers such as aramid fiber, polyamide fiber and polyethylene fiber. The sizing agent of the present invention is preferably applied to reinforcement fibers which reinforce thermoplastic matrix resins.

What is claimed is:

1. A sizing agent for a reinforcement fiber used for reinforcing a thermoplastic matrix resin, the sizing agent comprising
a neutralization product of a modified polypropylene resin that exhibits an endothermic heat of fusion not higher than 70 J/g in determination with a differential scanning calorimeter (DSC) and an amine compound having at least two hydroxyl groups or at least two amino groups in the molecule,
wherein the nonvolatile component of the sizing agent exhibits an endothermic heat of fusion not higher than 50 J/g in determination with a differential scanning calorimeter (DSC), and
the amine compound is a chemical compound represented by the following chemical formula (1) and/or chemical formula (2):

$$R^1N(CH_2CH_2OH)_2 \quad (1)$$

where $R^1$ is a hydrogen atom, —$CH_2CH_2OH$ or $C_1$-$C_5$ aliphatic hydrocarbon group;

$$NH_2R^2NH(CH_2CH_2OH) \quad (2)$$

where $R^2$ is a $C_1$-$C_2$ aliphatic hydrocarbon group.

2. A sizing agent for a reinforcement fiber according to claim 1, being formulated by blending the modified polypropylene resin in an amount ranging from 10 to 90 weight percent to the whole amount of the nonvolatile component of the sizing agent and the amine compound in an amount ranging from 1 to 20 weight percent to the whole amount of the nonvolatile component of the sizing agent.

3. A sizing agent for a reinforcement fiber according to claim 2, wherein the boiling point of the amine compound ranges from 240 to 340 deg. C.

4. A sizing agent for a reinforcement fiber according to claim 2, wherein the modified polypropylene resin has an acid value ranging from 20 to 80 KOHmg/g.

5. A sizing agent for a reinforcement fiber according to claim 2, wherein the thermoplastic matrix resin is a polyolefin resin.

6. A sizing agent for a reinforcement fiber according to claim 2, wherein the sizing agent further contains water and the neutralization product is dispersed or dissolved in the water.

7. A sizing agent for a reinforcement fiber according to claim 1, wherein the boiling point of the amine compound ranges from 240 to 340 deg. C.

8. A sizing agent for a reinforcement fiber according to claim 1, wherein the modified polypropylene resin has an acid value ranging from 20 to 80 KOHmg/g.

9. A sizing agent for a reinforcement fiber according to claim 1, the sizing agent further comprising at least one polymer component (A) selected from the group consisting of aromatic polyester resins and aromatic polyester polyurethane resins in an amount ranging from 5 to 80 weight percent to the whole amount of the nonvolatile component of the sizing agent.

10. A sizing agent for a reinforcement fiber according to claim 1, wherein the thermoplastic matrix resin is a polyolefin resin.

11. A sizing agent for a reinforcement fiber according to claim 1, wherein the sizing agent further contains water and the neutralization product is dispersed or dissolved in the water.

12. A sizing agent for a reinforcement fiber according to claim 1, wherein the modified polypropylene resin is a copolymer substantially containing propylene and an unsaturated carboxylic acid, and the sum of the propylene and unsaturated carboxylic acid in 100 mole percent of the total monomers to be copolymerized is at least 98 mole percent.

13. A sizing agent for a reinforcement fiber used for reinforcing a thermoplastic matrix resin, the sizing agent comprising
a neutralization product of a modified polypropylene resin and an amine compound having at least two hydroxyl groups or at least two amino groups in the molecule, and
at least one polymer component (A) selected from the group consisting of aromatic polyester resins and aromatic polyester polyurethane resins in an amount ranging from 5 to 80 weight percent to the whole amount of the nonvolatile component of the sizing agent, wherein the nonvolatile component of the sizing agent exhibits an endothermic heat of fusion not higher than 50 J/g in determination with a differential scanning calorimeter (DSC).

14. A synthetic fiber strand manufactured by applying a sizing agent for reinforcement fibers according to claim 1 to a base synthetic fiber strand.

15. A synthetic fiber strand according to claim 14, being manufactured of at least one base synthetic fiber selected from the group consisting of carbon fiber, aramid fiber, polyethylene fiber, polyethylene terephthalate fiber, polybutylene terephthalate fiber, polyethylene naphthalate fiber, polyarylate fiber, polyacetal fiber, PBO fiber, polyphenylene sulfide fiber and polyketone fiber.

16. A fiber-reinforced composite comprising a thermoplastic matrix resin and the synthetic fiber strand according to claim 14.

17. A fiber-reinforced composite comprising a thermoplastic matrix resin and the synthetic fiber strand according to claim 15.

* * * * *